United States Patent [19]

Morgan, Jr.

[11] 4,285,814

[45] Aug. 25, 1981

[54] FILTER BAG CLAMP ASSEMBLY

[75] Inventor: Howard W. Morgan, Jr., Michigan City, Ind.

[73] Assignee: Filter Specialists, Inc., Michigan City, Ind.

[21] Appl. No.: 108,587

[22] Filed: Dec. 31, 1979

[51] Int. Cl.³ .................................... B01D 29/26
[52] U.S. Cl. ............................ 210/315; 210/452; 210/453
[58] Field of Search ............ 55/375, 376, 378, 379; 210/232, 445, 451–454, 474, 477, 484, 497 R, DIG. 14, DIG. 17, 315; 285/361, 376, 396, 401, 402

[56] References Cited

U.S. PATENT DOCUMENTS

| 3,233,927 | 2/1966 | Dewhirst | 285/401 |
| 3,526,323 | 9/1970 | Smith | 210/484 |
| 3,814,261 | 6/1974 | Morgan | 210/484 |
| 4,149,863 | 4/1979 | Ballard | 55/379 |

Primary Examiner—Ivars C. Cintins
Attorney, Agent, or Firm—Oltsch, Knoblock & Hall

[57] ABSTRACT

A bag clamp assembly for a liquid filter wherein the clamp part of the assembly includes a cap and ring secured together by lock parts. The filter bag of the assembly is clamped between the rim and the cap to form a liquid-tight seal about the opening edge of the bag.

4 Claims, 4 Drawing Figures

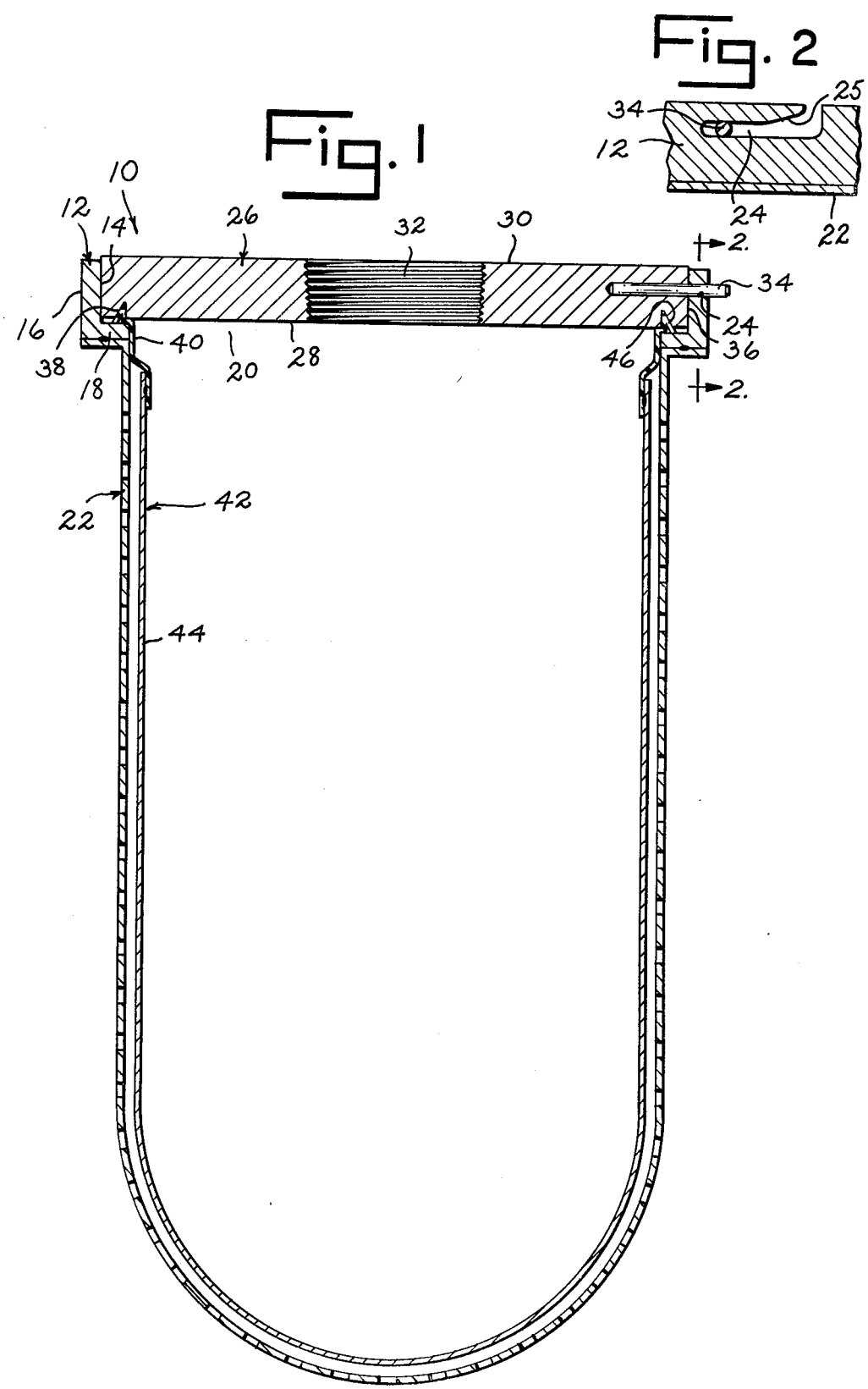

U.S. Patent    Aug. 25, 1981    Sheet 2 of 2    4,285,814
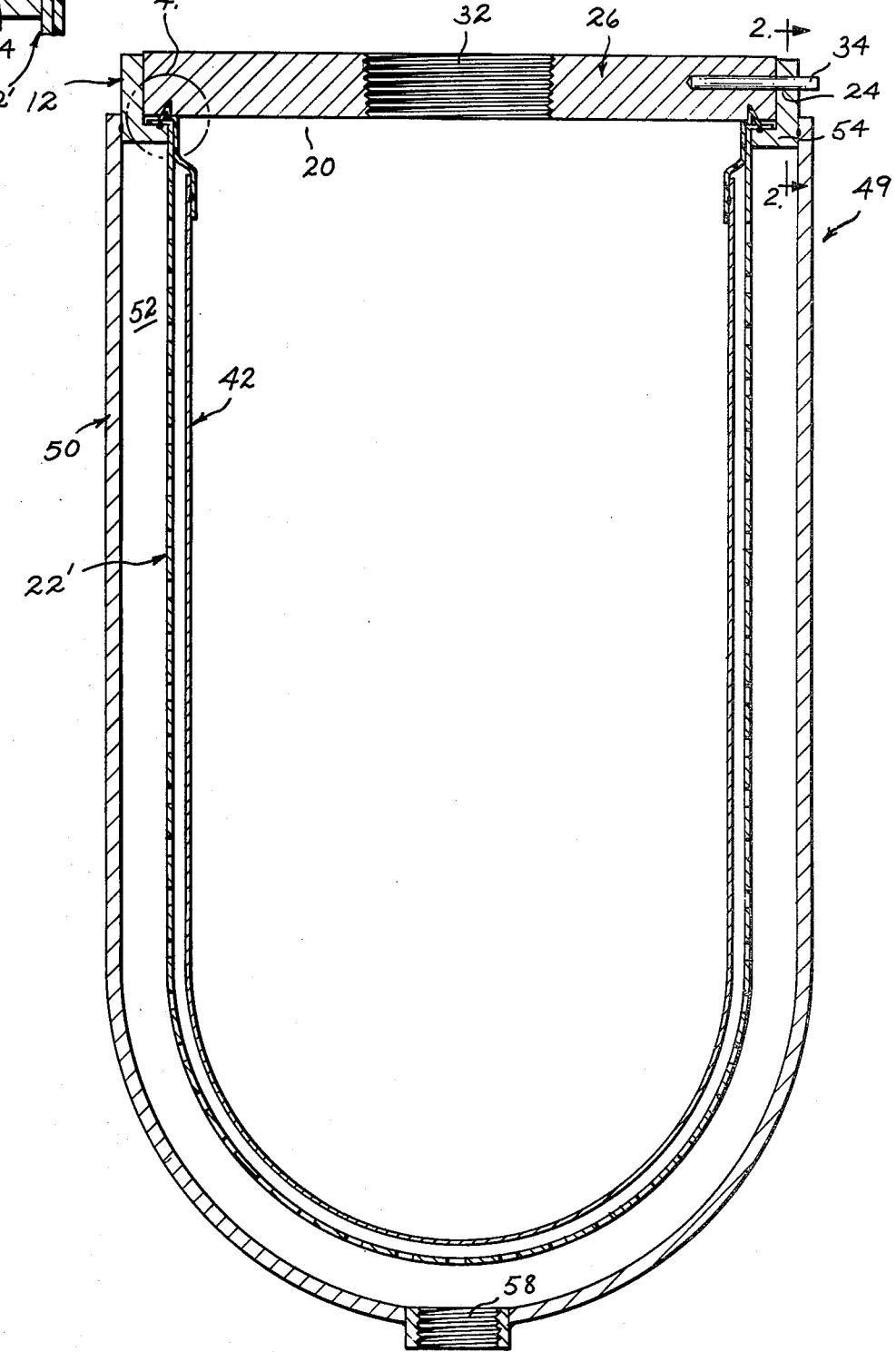

FILTER BAG CLAMP ASSEMBLY

SUMMARY OF THE INVENTION

This invention relates to a bag clamp assembly for a liquid filter.

In the assembly of this invention the filter bag includes a side wall formed of fluid pervious material and a marginal part defining the opening into the bag formed of a flexible, shape-retaining fluid impervious material. The assembly includes a cap having the filter inlet formed therein and a ring. The bag marginal part is clamped between the ring and cap. The ring may carry a reticulated support basket for the bag or even be joined to the outer housing of the filter.

Accordingly, it is an object of this invention to provide an improved liquid filter bag seal assembly.

Another object is to provide an improved liquid filter.

Still another object is to povide a liquid filter which is efficient and economical.

Yet another object is to provide a liquid filter bag assembly in which the bag thereof can be easily serviced.

Other objects will be apparent from the following description.

BRIEF DESCRIPTION OF THE DRAWINGS

FIG. 1 is a vertical sectional view of one embodiment of the bag clamp assembly of the filter.

FIG. 2 is a detailed sectional view as seen from line 2—2 of FIG. 1.

FIG. 3 is a vertical sectional view of a filter showing another embodiment of the invention.

FIG. 4 is an enlarged detailed sectional view of that portion of FIG. 3 enclosed within broken line circle 4.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Referring to FIG. 1, bag assembly 10 includes a ring 12 having an inner wall 14 and an outer wall 16. Ring 12 includes an inwardly projecting annular flange 18 extending from its inner wall 14. Flange 18 defines the opening 20 within ring 12. A filter basket 22 of a shape-retaining perforated material, such as metal screening, is attached to ring 12 below flange 18. The inner wall 14 of the ring has a plurality of lock slots 24 in it. Lock slots 24 are positioned equiangularly about inner wall 14.

A cap 26 spans the opening 20 of ring 12. Cap 26 includes an inner face 28 and an outer face 30. A liquid inlet 32 extends through cap 26 from outer face 28 to inner face 30. A plurality of pins 34, equal in number to the lock slots 24 of ring 12, are located equiangularly about the circumferential edge 36 of cap 26. As illustrated in FIG. 2, pins 34 fit into lock slots 24 of ring 12 to secure cap 26 to the ring. Each slot 24 includes a tapering cam surface 25 whose function will be later described. Annular groove 38 in inner face 28 of cap 26 accepts marginal part 40 of bag 42 when the cap is secured in place.

A filter bag 42 is removalby inserted into basket 22 through ring opening 20. Bag 42 includes a side wall 44 formed of a liquid pervious material, such as cloth or a plastic mesh, and a marginal part 40 formed of a flexible shape-retaining liquid impervious material, such as a solid plastic. Marginal part 40 defines the opening into bag 42. Part 40 includes an external downturned annular lid 46 which is continuous about the circumference of the part and which is preferably conically tapered.

In use, a filter bag 42 is inserted into basket 22 through opening 20 of ring 12. Marginal part 40 of bag 42 rests upon flange 18 of ring 12. Cap 26 is then inserted into opening 20 of ring 12 and upon bag 42 with pins 34 fitting into lock slots 24. Cap 26 is then rotated relative to ring 12 which causes pins 34 to engage cam surfaces 25 of ring slots 24 with the cap being urged against bag marginal part 40 to compress lip 46 of the bag about its circumferential dimension between groove 38 of the cap and flange 18 of the ring. In this manner bag marginal part 40 makes a liquid-tight seal with ring 14. The seal formed, therefore, extends completely around the perimeters of ring 12 and cap 26. Thus, the interior of bag 42 within basket 22 is sealed in a liquid-tight manner at bag lip 46. Liquid admitted through inlet 32 in cap 26 will pass through the liquid pervious material of bag side wall 44 and through basket 22.

FIGS. 3 and 4 illustrate another embodiment of the invention. In this embodiment, a filter 49 is shown with ring 12 attached to the filter housing 50. A filter basket 22' of a perforated shape-retaining material is removably fitted into housing chamber 52 through opening 20 in ring 12. Basket 22'includes an annular outturned flange 54 which defines the opening into the basket and which is supported upon internal flange 18 of ring 12. An O-ring 56 is positioned between flanges 54 and 18. Filter bag 42 is inserted into basket 22'. Bag lip 46 is positioned between basket flange 54 and cap 26 at groove 38 therein to provide a liquid-tight seal between the basket at flange 54 and cap 26 when the cap is locked into ring 12. Liquid admitted through inlet 32 will pass through filter bag 42 and basket 22' and out outlet 58 of the filter.

It is to be understood that the invention is not to be limited to the precise forms disclosed but that it may be modified within the scope of the appended claims. One such modification would be the use of the assembly of FIG. 1 without basket 22. Also it may not be necessary to provide cap 26 with a groove 38 or, as depicted in FIG. 3, to use O-ring 56.

What I claim is:

1. A bag clamp assembly for use in a liquid filter, said assembly comprising a ring, said ring being defined by an outer wall and an inner wall, said inner wall including a lower annular flange extending radially inwardly from the inner wall, a cap fittable within said ring, said cap having a substantially solid body and including a lateral circumferential edge, said cap body including inner and outer faces and having a bore therethrough extending from said inner face to said outer face, said bore constituting a liquid inlet, one of said ring outer wall and said cap lateral edge carrying a plurality of pin means extending radially therefrom, the other of said ring outer wall and said cap lateral edge having a plurality of lock slots formed therein, said pin means for cooperating with said lock slots to secure said cap to said ring with its lower face spaced from the ring flange when the cap is fitted into the ring, and a removable filter bag including reticulated side walls and having an open end defined by a shape-retaining liquid impervious marginal part, said bag open end positioned under said cap bore with said bag marginal part compressively retained between said cap lower face and said ring flange.

2. The clamp assembly of claim 1, wherein said lower face of the cap includes an annular groove therein, said cap groove being located adjacent the lateral edge of said cap, said marginal part of the bag fitted into said cap groove.

3. The clamp assembly of claim 1 wherein said ring carries a rigid filtering basket, said bag side wall extending supportedly into said basket.

4. The clamp assembly of claim 1 and a filter housing including a side wall and a bottom wall, a liquid outlet in said housing, said housing having an open upper marginal section, said ring connected to said housing upper marginal section, a rigid filtering basket including an out-turned opening defining lip, said basket lip compressively retained between said bag open end and said ring flange with said bag side wall extending supportedly into said basket.

* * * * *